(12) United States Patent
Friedman et al.

(10) Patent No.: US 10,555,369 B2
(45) Date of Patent: Feb. 4, 2020

(54) NETWORK CLOUD LOAD DISTRIBUTION FOR AN ELECTRIC VEHICLE APPLICATION

(71) Applicant: Toyota Motor Engineering & Manufacturing North America, Inc., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 73 days.

(21) Appl. No.: 15/866,722

(22) Filed: Jan. 10, 2018

(65) Prior Publication Data
US 2019/0215898 A1   Jul. 11, 2019

(51) Int. Cl.
| *H04W 52/02* | (2009.01) |
| *H04W 76/34* | (2018.01) |
| *H04W 4/40* | (2018.01) |
| *H04B 17/318* | (2015.01) |
| *H04L 29/08* | (2006.01) |

(52) U.S. Cl.
CPC .......... *H04W 76/34* (2018.02); *H04B 17/318* (2015.01); *H04L 67/12* (2013.01); *H04W 4/40* (2018.02)

(58) Field of Classification Search
CPC ........ H04W 76/34; H04W 4/40; H04L 67/12; H04B 17/318
See application file for complete search history.

(56) References Cited

U.S. PATENT DOCUMENTS

| 8,645,014 | B1 * | 2/2014 | Kozlowski | .............. H04W 4/70 701/24 |
| 9,079,505 | B1 * | 7/2015 | Hyde | .................. G06Q 10/0631 |
| 9,135,024 | B2 * | 9/2015 | Kamay | .................... G06F 9/452 |
| 9,639,843 | B1 * | 5/2017 | Kozlowski | .............. H04W 4/70 |
| 9,736,232 | B2 * | 8/2017 | Bragstad | .............. H04L 41/5025 |
| 2005/0215260 | A1 | 9/2005 | Ahya et al. | |
| 2009/0083019 | A1 * | 3/2009 | Nasle | .................... G06F 17/509 703/18 |
| 2013/0062966 | A1 * | 3/2013 | Verghese | ................ H02J 7/025 307/104 |

(Continued)

*Primary Examiner* — Jay P Patel
(74) *Attorney, Agent, or Firm* — Christopher G. Darrow; Darrow Mustafa PC (57) ABSTRACT

A method and device are provided to monitor a wireless link state for an electric-powered vehicle, and comparing the wireless link state with a wireless-link trigger condition. When the wireless link state compares favorably with the wireless-link trigger condition, a thick-client application request may be transmitted based on the wireless-link trigger condition. A thick-client application load is received in response, and the thin-client application is transitioned to a thick-client application.

20 Claims, 4 Drawing Sheets

(56) References Cited

U.S. PATENT DOCUMENTS

| | | | |
|---|---|---|---|
| 2013/0165231 A1* | 6/2013 | Nelson | G07F 17/3206 463/42 |
| 2013/0290289 A1* | 10/2013 | Yu | G06F 16/9535 707/706 |
| 2014/0378204 A1* | 12/2014 | Michel | G07F 17/329 463/17 |
| 2015/0195121 A1* | 7/2015 | Bragstad | H04L 41/14 709/224 |
| 2015/0339745 A1* | 11/2015 | Peter | G06F 16/9558 705/26.42 |
| 2016/0071509 A1 | 3/2016 | Zhao et al. | |
| 2016/0092962 A1* | 3/2016 | Wasserman | G06Q 30/0631 705/26.7 |
| 2016/0241638 A1* | 8/2016 | Bragstad | H04L 41/5025 |
| 2016/0243956 A1* | 8/2016 | Yuan | B60L 11/1816 |
| 2017/0017774 A1* | 1/2017 | Skoda | H04L 67/42 |
| 2017/0132568 A1* | 5/2017 | Glunz | G06T 19/00 |
| 2017/0274789 A1* | 9/2017 | Ma | B60L 53/65 |
| 2017/0308926 A1* | 10/2017 | Wofford | G06Q 30/0245 |
| 2018/0027071 A1* | 1/2018 | Toepke | H04L 67/1095 709/217 |
| 2018/0114081 A1* | 4/2018 | Dejewski | G06K 9/00892 |
| 2019/0073373 A1* | 3/2019 | Surale | H04L 63/0428 |
| 2019/0122142 A1* | 4/2019 | Brunn | G06N 20/00 |

* cited by examiner

FIG. 3
client application load management unit 110

FIG. 4

NETWORK CLOUD LOAD DISTRIBUTION FOR AN ELECTRIC VEHICLE APPLICATION

FIELD

The subject matter described herein relates in general to application management for an electric vehicle and, more particularly, to cloud-cache distribution of electric-power vehicle applications based on electric-power conservation for the hybrid-vehicle.

BACKGROUND

Generally, electric-powered vehicles include a battery with limited electrical energy storage. With the stored energy, an electric-powered vehicle may travel to a destination; however, other electric components of an electric-powered vehicle may affect the vehicle range. For example, other components that consume the stored energy include an HVAC system, an entertainment system, a voice recognition system, a navigation system, wireless communications system, etc. To provide these functions, the electrical components of the vehicle control modules, such as the processor, memory, bus controllers, etc., also consume stored energy to carry out their respective functions. Power savings are sought so that an electric-powered vehicle may reach a selected destination, while also providing passenger and/or driver comforts along the way.

SUMMARY

A device and method for conserving stored-energy of an electric-powered vehicle battery by selective thin-client and thick client application based on thin-client server availability are disclosed.

In an example embodiment, a method includes monitoring a wireless link state for an electric-powered vehicle, and comparing the wireless link state with a wireless-link trigger condition. When the wireless link state compares favorably with the wireless-link trigger condition, a thick-client application request may be transmitted based on the wireless-link trigger condition. A thick-client application load is received in response, and the thin-client application is transitioned to a thick-client application.

In another example embodiment, a client application load management unit for an electric vehicle includes a communication interface a communication interface to service communication with a vehicle network and an external network, a processor communicably coupled to the communication interface and a memory. The memory is communicably coupled to the processor and stores an electric-vehicle client application load module including instructions that, when executed by the processor, cause the processor to produce frequency-of-use data, and receive, in response to the frequency-of-use data, a principal set of client applications data that functions to identify a principal set of thin-client applications for an electric vehicle, in which a thin-client image for each of a principal set of thin-client applications is loaded. The memory further stores a wireless link module including instructions that, when executed by the processor, cause the processor to monitor a wireless link state for an electric-powered vehicle, compare the wireless link state with a wireless-link trigger condition, and when the wireless link state compares favorably with the wireless-link trigger condition, transmit, via a wireless link, a thick-client application request, and receive, in response, a thick-client application image for the each of the principal set of client applications. The thin-client application of the each of the principal set of thin-client applications are transitioned to produce a respective thick-client application.

BRIEF DESCRIPTION OF THE DRAWINGS

The description makes reference to the accompanying drawings wherein like reference numerals refer to like parts throughout the several views, and wherein.

DETAILED DESCRIPTION

A device and method for conserving stored-energy of an electric-powered vehicle battery by selective thin-client and thick client application based on thin-client server availability are described herein.

Generally, electric-powered vehicle relies upon a state-of-charge of the vehicle power source, such as a vehicle battery. Vehicle batteries may have on-board recharge capability, such as with hybrid vehicles having a combustion engine and vehicle battery combination, as well as instances that may implement fuel cell technology. Battery-powered electric vehicles (BEVs) may generally be reliant on the next instance for a recharge station, whether at the vehicle owner's home, charging stops along a travel path, etc. The potential travel range of the vehicle may be estimated by the power source state-of-charge, which may be considered analogous to a conventional vehicle fuel gauge.

Other instances in which conservation of a battery state-of-charge may be present are when the recharge device, such as a combustion engine, a solar-cell array, a fuel-cell, etc., may be insufficient to sustain a state-of-charge for operation of the vehicle range and/or the on-board applications directed to the vehicle operator and/or passenger.

A battery-powered electric vehicle, has various electric loads that require electric power from the power source, such as a vehicle power train for locomotion, a heating, ventilation and air conditioning (HVAC) control unit and associated electronic components, a navigation control unit with GPS and motion sensor components, a voice control unit and associated electronic components, etc. To concentrate an available state-of-charge on vehicle travel, various strategies may be implemented on other secondary and/or non-essential electric loads for the vehicle. A general strategy may be to power the vehicle power train to a destination, while also providing a level of comfort and convenience to the vehicle passengers. One aspect of conserving the state-of-charge for a vehicle power source may be to implement thin client applications.

For a client/server architecture, an initial assessment may be whether the client or the server handles the bulk of the workload, and in this regard, the assignment of processing and power resources as well. A client in this respect may relate to an application that is executable by the local vehicle control unit (such as a HVAC control unit, a navigation control unit, a voice control unit, etc.), and relies on a server to perform as few or as many operations relating to the application.

For a thin client architecture, a terminal or Java-based client may be executable via a control unit based a thin hardware platform. In this respect, a lower power requirement may be had for the implementation of a thin hardware platform, while extensive processing requirements may be transferred to a server architecture via a wireless communication of the vehicle. The advantages of a thin-client application may be limited, however, by the stability of wireless communications with the vehicle, or by the affordability of the wireless link.

For example, the wireless links may become unstable due to interference with the link, such as by dead zones that may occur due to a lack of service coverage by a service provider and/or obstruction by tunnels, buildings, etc. In some instances as well, the wireless signal may transition to a lower upload/download data rate, such as from an LTE-based signal to a slower 3G-based signal. Though the wireless communication may still be present, the effectiveness for providing real-time and/or near real-time data processing may be curtailed by lower data rates. As another example, when traveling abroad, wireless data services may be comparatively expensive, and may also incur additional roaming fees that may be charged on a per Megabyte-per-second basis.

In this regard, continuity-of-function for an application to a vehicle passenger and/or driver, despite an unfavorable wireless link state for the vehicle, may be provided as described in detail with respect to FIGS. 1-4.

Figure 1:
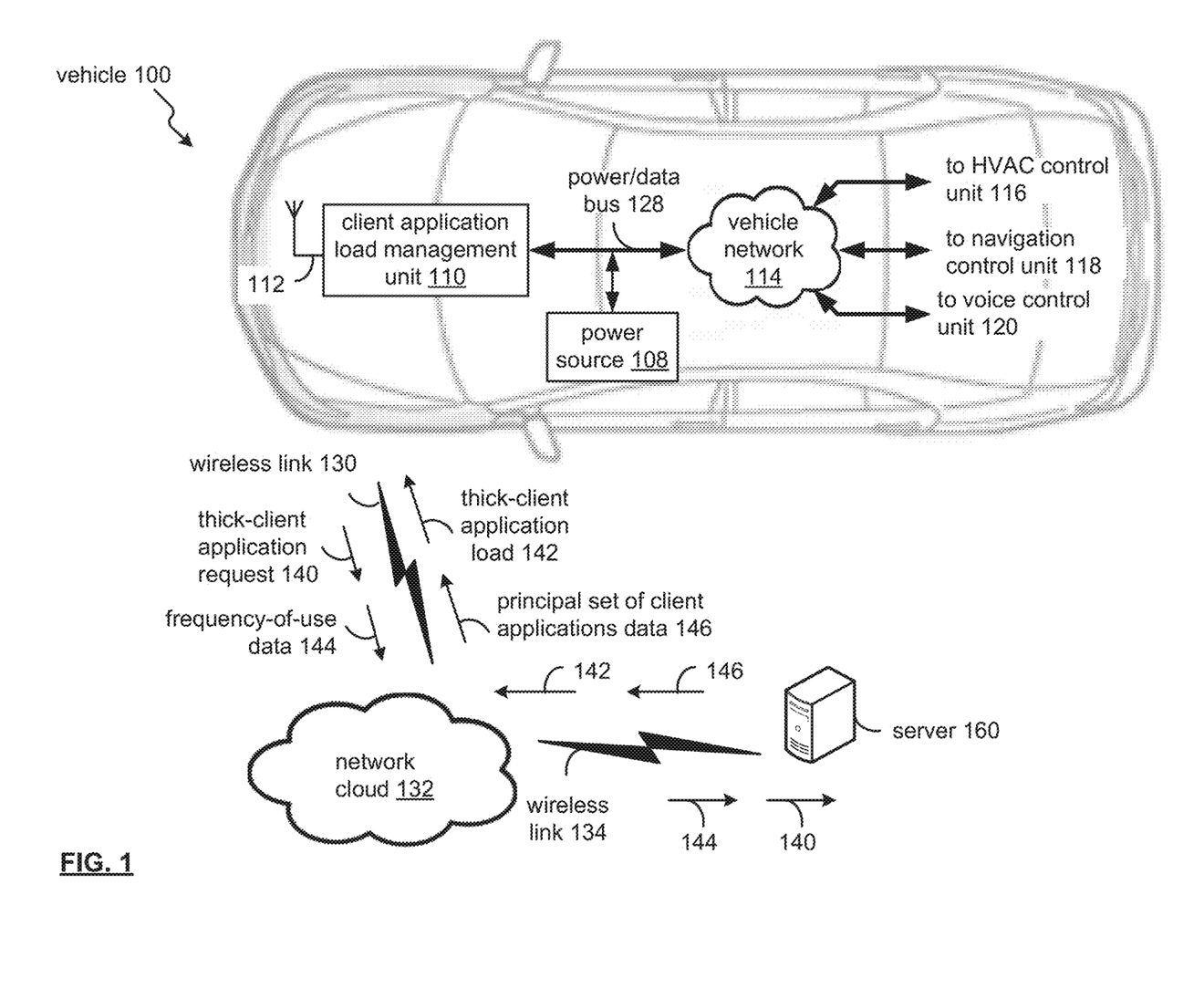
FIG. 1 illustrates a block diagram of an electric vehicle that includes a client application load management unit.

FIG. 1 illustrates a block diagram of an electric vehicle 100 that may include a power source 108, a client application load management unit 110, a vehicle network 114, coupled by a power/data bus 128. The vehicle 100 may be a vehicle dependent upon recharging devices such as solar cells, external recharge devices coupled to an electric supply grid, combustion engine electric generators, fuel-cell electric generators, etc. Types of the vehicle 100 may include motorcycles, bicycles, scooters, skateboards, rail cars, watercraft, forklifts, buses, trucks, cars, etc.

In other configurations, the vehicle 100 may include battery electric vehicles (BEV), battery-only electric vehicles (BOEV), Full Electric Vehicles (FEV), etc. Electric vehicles may be considered to be those vehicles that use chemical energy stored in rechargeable battery packs, and may use electric motors and motor controllers instead of internal combustion engines (ICEs) for propulsion. Because power may be derived from battery packs, these vehicles may not typically include internal combustion engines, fuel cells, and/or fuel tanks.

The vehicle 100 may operate to provide applications for operation of the vehicle, including HVAC control applications, navigation applications, entertainment applications, voice control applications, etc. An example of a commercially-available application may include an Entune™ application suite that may operate as an in-dash smart service that may connect an operator and/or passenger of a vehicle to music content, social-media content, and to other entertainment applications. Other applications that may be presented include an integrated navigation application, a voice recognition application, an HD Radio™ application, etc.

With respect to an application load for the vehicle 100, all, some or partial applications may be implemented to be executed by the vehicle operator. When loaded, the each of the applications may be implemented as either a thick-client or a thin-client version based upon the amount of resources called upon for execution of the application by the client application load management unit 110. For example, some applications may not be processor and/or memory resource intensive, and may be a necessary application for operation of the vehicle 100, such as power train applications relating to differential control of electric motors to operate the propulsion of the vehicle, applications relating to power management of the power source 108 to optimize and/or extend the state-of-charge for the power source 108, etc.

Other applications may be considered ancillary to the main objective of the vehicle, such as having the capability to reach within an allotted objective and/or intermediate objective (such as a charging way-station). Examples of ancillary, though important for passenger and/or driver comfort, may include an HVAC control application for an HVAC control unit 116, a navigation application for a navigation control unit 118, a voice control application for a voice control unit 120, etc.

A thin client architecture may be executable via a control unit based on a thin hardware platform. In this respect, state-of-charge for the power source 108 may be conserved in view of a lower power requirement for implementation of the thin-client application. Extensive processing requirements may be off-loaded to a server 160, which may be accessed via the antenna 112 through a wireless link 130 and 134 and a network cloud 132.

Moreover, the client application load management unit 110 may operate to observe passenger and/or operator interaction with vehicle applications generally. With respect to applications that are seldom or never used by a passenger and/or operator, the management unit 110 may transmit frequency-of-use data 144 to the server 160. Based on the frequency-of-use data 144, the server 160 may generate in response a principal set of client applications data 146. The principal set of client applications data 146 conveys to the client application load management unit 110 the "live," or active, applications for the vehicle 100. In this respect, local processing and memory resources relative to the vehicle 100 may be allocated to applications that may be likely to be used, and may be implemented as thin-client applications to further conserve a state-of-charge for the power source 108.

Additional state-of-charge conservation may be realized by reducing the footprint of an application by removing generally unused components, on a frequency-of-use basis, from the thin-client application.

For the example of a voice recognition application, voice inputs may be received, via microphone sensor devices, from a vehicle passenger and/or operator, and may be analyzed through voice recognition technologies (Automated Speech Recognition (ASR), Natural Language Generation (NLG), etc.). The resident vocabulary library footprint (that is, memory and/or processor allocation) may be resident as a reduced voice-command library based on common words spoken by the passengers and/or operator of the vehicle. An example may include limiting the resident vocabulary library to the voice command "wake-up-word," which may operate to place the voice command recognition in a state to wait for a following high-likelihood command (such as, "increase the HVAC fan," "select next song," "locate the closest post office," etc.). A high-likelihood voice command may be based on historic use and preference patterns of the vehicle passenger and/or operator.

For optimizing and/or conserving a state-of-charge for the power source 108, the client application load management unit 110 may operate to shift a bulk of an application execution to a server 133, which is positioned remotely relative to the vehicle 100. In the example of voice recognition application, the client application load management unit 110 may shift a bulk of the resource consumption to the server 133 instead of locally at the vehicle 100. In this respect, a thin-client platform may be implemented with a control unit, such as the client application load management unit 110, reducing the amount of memory devices and processor devices that are implemented on the control unit 110.

In operation, the vehicle 100 may be communicatively coupled to the server 160 to provide a thin-client/server configuration to provide application functionality at the vehicle 100. However, there may be instances in which the vehicle 100 may enter a wireless-link trigger condition in which a location or upcoming location proffers a wireless communication link that may be and/or become non-existent, limited, or expensive to use.

For example, the wireless-link trigger condition may be an a priori no-service condition. In this respect, such as with respect to cellular provider coverage, geographic areas may not be serviced by a wireless service provider and/or obstructed by tunnels, buildings, etc. Such areas may generally be discoverable by coverage maps and identified wireless dead zones. A location of the vehicle 100 may be determined in real-time or near real-time to determine the a priori boundary beyond which the wireless link 130 may be at an a priori no-service condition.

As another example, the wireless-link trigger condition may be that the wireless link 130 suffers a wireless-link signal degradation condition. In this respect, the wireless link 130 may exist, but at a less-than-optimal strength (such as low signal-to-noise ratio), at an excessive collision or high error rate that may require multiple retransmission of data to/from the server 160 (such as a high bit-error rate), that the wireless link 130 may revert to a lower data rate (such as from an LTE data rate to a 3G data rate), etc. Also, in some instances as well, the wireless signal may transition to a lower upload/download data rate, such as from an LTE-based signal to a slower 3G-based signal. Though the wireless communication may still be present, the effectiveness for providing real-time and/or near real-time data processing may be curtailed by lower data rates.

As yet another example, the wireless-link trigger condition may be an excessive wireless-link service cost condition. For example, while data rates fees may be considered tolerable or reasonable in one service area, on traveling with the vehicle to another service area (such as another carrier), the data rate fees for comparable data rates may be excessive, may incur roaming charges, and also may cause the beacon function of the wireless link 130 to excessively burden a state-of-charge for the power source 108.

In this respect, the client application load management unit 110 may operate to monitor a wireless link state of the wireless link 130 for the electric-powered vehicle 100. The wireless link state of the wireless link 130 may be compared with a wireless-link trigger condition, or a plurality of wireless-link trigger conditions as described in detail here. When the wireless link state compares favorably with the wireless-link trigger condition, indicating that the wireless link 130 is approaching and/or undergoing the wireless-link trigger condition, in which a continuity-of-application functionality may be desired despite the tenuous nature of the wireless link 130.

The client application load management unit 110 may transmit, via the wireless link 130 a thick-client application request 140 based on the wireless-link trigger condition. The client application load management unit 110 may receive, in response, a thick-client application load 142. The thick-client application load 142 may include components that permit the application to be executed at the vehicle via a control unit, such as that of the client application load management unit 110.

For the example of a voice command application, the client application load management unit 110 may operate to receive a thick-client application load 142, and transition a thin-client application to a thick-client application.

To transition to a thick-client application, the client application load management unit 110 may operate to temporarily retain a limited amount of the voice recognition capabilities while the wireless link state compares favorably with the wireless-link trigger condition. In this respect, a limited amount of the voice recognition code may be cached with the client application load management unit 110, or with other control units of the vehicle 100, such as a voice control unit 120.

That is, though the wireless link 130 is unavailable, such as due to a wireless-link signal degradation condition, an a priori no-service condition, an excessive wireless-link service cost condition, etc., a vehicle passenger and/or operator may continue to use specific aspects of the voice recognition application, as with other applications that may be so managed by the client application load management unit 110.

In this respect, conservation of the state-of-charge of the power source 108 may be recognized. Such thin-client to thick-client transition may be implemented for other applications, such as an HVAC control unit 115 operable to execute an HVAC application, a navigation control unit 118 operable to execute a navigation application, etc.

As another example, when traveling abroad, wireless data services may be comparatively expensive, and may also incur additional roaming fees that may be charged on a per Megabyte-per-second basis.

In this manner, continuity-of-function for an application to a vehicle passenger and/or driver, despite an unfavorable wireless link state for the vehicle, may be provided as described in detail with respect to FIGS. 1-4.

Figure 2:
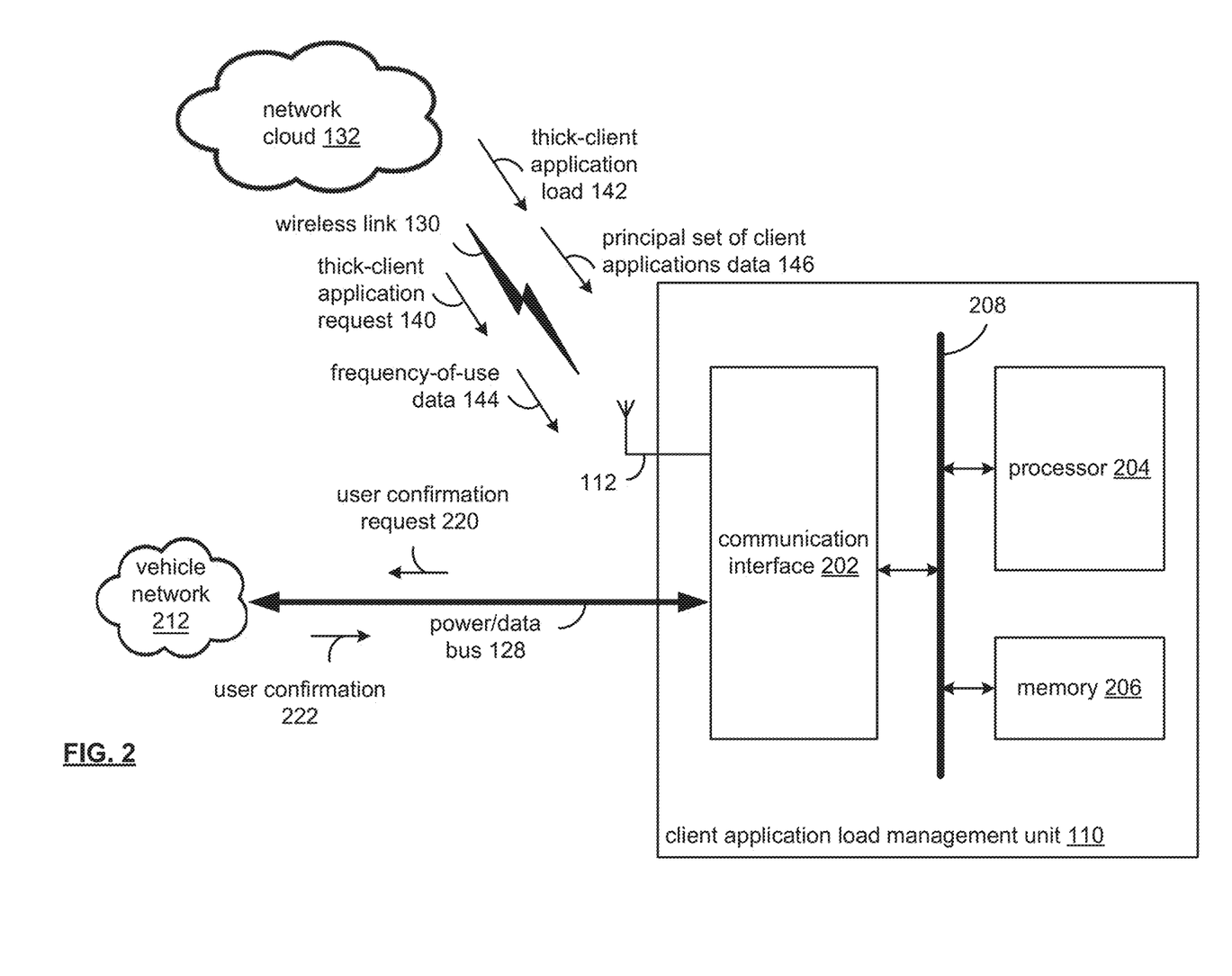
FIG. 2 illustrates a block diagram of the client application load management unit of FIG. 1.

FIG. 2 illustrates a block diagram of the client application load management unit 110 of FIG. 1. The client application load management unit 110 may include a communication interface 202, a processor 204, and memory 206, that are communicably coupled via a bus 208. The client application load management unit 110 may provide an example platform for the device and methods described in detail with reference to FIGS. 1-4, such as to HVAC control unit 116, to navigation control unit 118, to voice control unit 120, etc.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable storage medium having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed and/or executed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-4.

The client application load management unit 110 can include one or more modules, at least some of which are described herein. The modules may be considered as functional blocks that can be implemented in hardware, software, firmware and/or computer-readable program code that perform one or more functions.

A module, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The communication interface 202 generally governs and manages the data received via a vehicle network 212, such as user confirmation request 220 provided to the vehicle network 212 via the power/data bus 128, as well as user confirmation 222. The communication interface 202 may also operate to manage data flow with respect to external networks, such as the network cloud 132. Examples of data may include frequency-of-use data 114 transmitted via the antenna 112, and receipt of principal set of client applications data 146 in response, and thick-client application request 140 transmitted via the antenna 112, and receipt of thick-client application load 142 in response via the wireless link 130.

There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system (GPS) satellites. The received signals may be transformed into a data signal indicative of the location (for example, latitude and longitude positions), and further indicative of the positioning of the vehicle with respect to road data.

The client application load management unit 110 may be communicatively coupled to receive signals from global positioning system satellites, such as via the antenna 112 of the client application load management unit 110, or other such vehicle antennae (not shown). The antenna 112 operates to provide communications with the client application load management unit 110 through wireless link 130.

In operation, the client application load management unit 110 may be operable to generate a principal set of client applications, which may be conveyed via data 146, based on a frequency-of-use basis provided via frequency-of-use data 144. The client application load management unit 110 may load a thin-client image for each of the principal set of client applications identified via the data 146.

The client application load management unit 110 may monitor a wireless link state for the electric-powered vehicle 100, and compare the wireless link state with a wireless-link trigger condition. When the wireless link state compares favorably with the wireless-link trigger condition, the client application load management unit 110 may operate to transmit a thick-client application request 140, and receive, in response a thick-client application load for the each of the principal set of client applications.

The client application load management unit 110 may, with the thick-client application load, transition the thin-client application of the each of the principal set of client applications to a respective thick-client application.

In this respect, client application load management unit 110 may transition a thin-client application to a thick-client application based on a wireless link state of the wireless link 130. That is, the transition may be based upon when the wireless link 130 may become degraded, has an a priori no-service condition, and/or an excessive wireless-link service cost condition, as is discussed in detail with reference to FIGS. 3 and 4.

Figure 3:
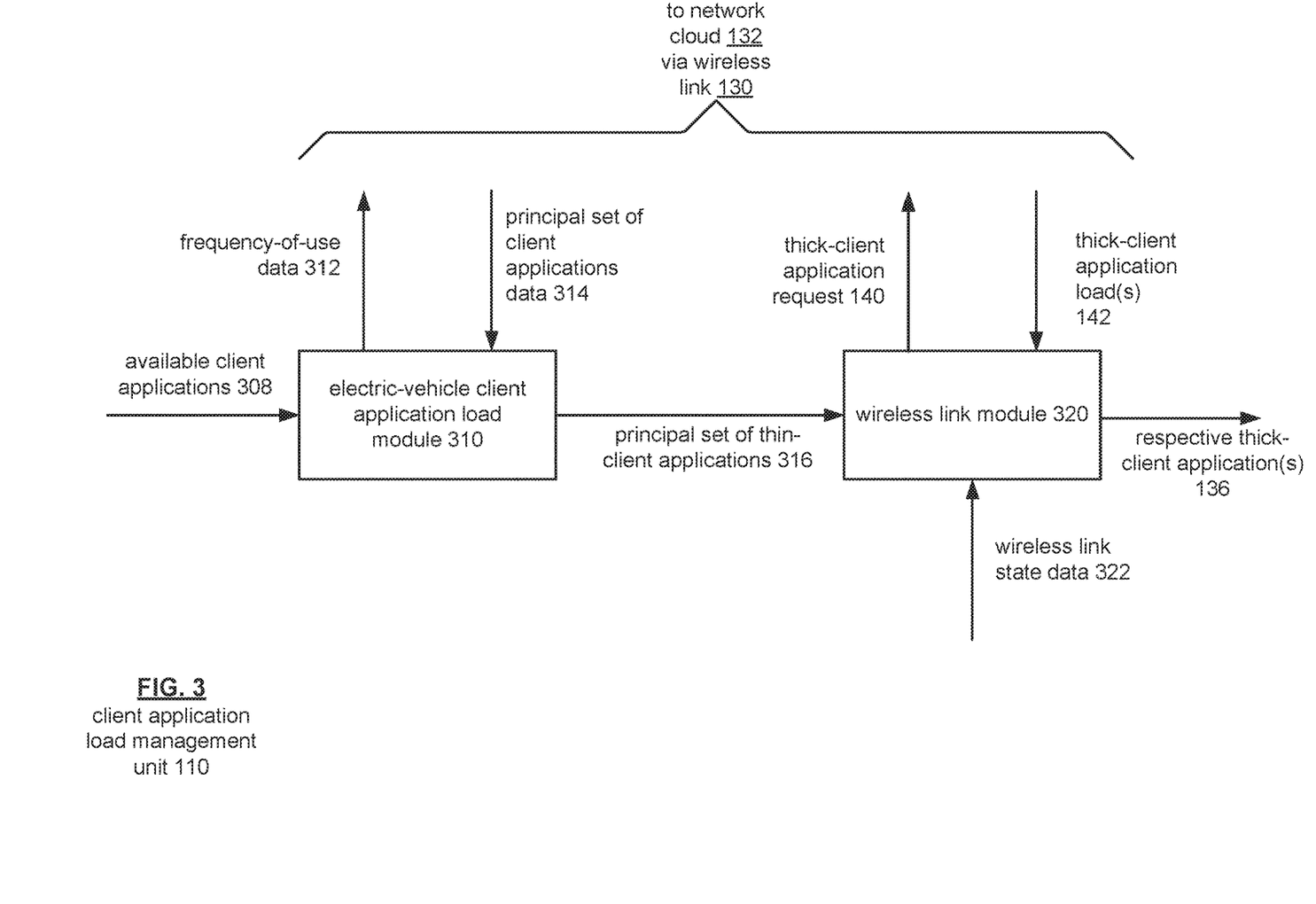
FIG. 3 illustrates a functional block diagram of the client application load management unit of FIG. 2 for transitioning a thin-client application to a thick-client application based on a wireless link state of a wireless link.

FIG. 3 illustrates a functional block diagram of the client application load management unit 110 for transitioning a thin-client application to a thick-client application based on a wireless link state of the wireless link 130. The client application load management unit 110 may include an electric-vehicle client application load module 310, and a wireless link module 320, where the modules 310 and 320 may be stored in the memory 206 (FIG. 2) of the client application load management unit 110.

Each of the modules may include instructions that, when executed by the processor 204 (FIG. 2), cause the processor 204 to engage in certain functions and/or objectives as described herein in detail.

The electric-vehicle client application load module 310 includes instructions that, when executed by the processor, cause the processor to produce a frequency-of-use data 312, which relates to the frequency a vehicle application may be used, and the components thereof (such as an English language library as contrasted to another language library for a voice command module), and receive in response, a principal set of client applications data 314.

With the principal set of client applications data 314, the electric-vehicle client application load module 310 generates a principal set of thin-client applications 316. In this respect, a state-of-charge for a vehicle power source may be conserved by limiting the footprint of processor and/or memory resources to applications generally used in operation of the vehicle (such as a navigation application, an HVAC application, etc.), and by loading a thin-client image for each of the principal set of client applications based on data 314. Moreover, components that may generally be unused may also be left from the thin-client image. For example, in a voice command application context, the image may not include libraries with seldom used voice commands.

The wireless link module 320 may include instructions that, when executed by the processor, cause the processor to monitor a wireless link state for an electric-powered vehicle via the wireless link state data 322. The wireless link module 320 may include instructions that, when executed by the processor, cause the processor to compare the wireless link state with a wireless-link trigger condition.

The wireless-link trigger condition may be an a priori no-service condition. In this respect, such as with respect to cellular provider coverage, geographic areas may not be serviced by a wireless service provider and/or obstructed by tunnels, buildings, etc. Such areas may generally be discoverable by coverage maps and identified wireless dead zones. A location of a vehicle 100 (FIG. 1) may be determined in real-time or near real-time through GPS devices to determine the a priori boundary beyond which the wireless link 130 may be at an a priori no-service condition.

As another example, the wireless-link trigger condition may be that the wireless link 130 suffers a wireless-link signal degradation condition. In this respect, the wireless link 130 may exist, but at a less-than-optimal strength (such as low signal-to-noise ratio), at an excessive collision or high error rate that may require multiple retransmission of data to/from the server 160 (such as a high bit-error rate), that the wireless link 130 may revert to a lower data rate (such as from an LTE data rate to a 3G data rate), etc. Also, in some instances as well, the wireless signal may transition to a lower upload/download data rate, such as from an LTE-based signal to a slower 3G-based signal. Though the wireless communication may still be present, the effectiveness for providing real-time and/or near real-time data processing may be curtailed by lower data rates.

As yet another example, the wireless-link trigger condition may be an excessive wireless-link service cost condition. For example, while data rates fees may be considered tolerable or reasonable in one service area, on traveling with the vehicle to another service area (such as another carrier), the data rate fees for comparable data rates may be excessive, may incur roaming charges, and also may cause the beacon function of the wireless link 130 to excessively burden a state-of-charge for the power source 108.

In this respect, the wireless link module 320 of the client application load management unit 110 may operate to monitor a wireless link state of the wireless link 130 for the electric-powered vehicle 100. The wireless link state of the wireless link 130 may be compared with a wireless-link trigger condition, or a plurality of wireless-link trigger conditions as described in detail here.

When the wireless link state compares favorably with the wireless-link trigger condition, indicating that wireless link 130 is approaching and/or undergoing the wireless-link trigger condition, in which a continuity-of-application functionality may be desired despite the tenuous nature of the wireless link 130.

The wireless link module 320 includes instructions that, when executed by the processor, and when the wireless link state conveyed via the wireless link state data 322 compares favorably with the wireless-link trigger condition, cause the processor to transmit, via the wireless link 130 to network cloud 132 a thick-client application request 140, and receive, in response, a thick-client application load(s) 142 for the each of the principal set of thin-client applications.

The wireless link module 320 includes instructions that, when executed by the processor, cause the processor to transition the thin-client application of each of the principal set of thin-client applications to produce respective thick-client applications 136.

In this respect, client application load management unit 110 may transition a thin-client application to a thick-client application based on wireless link state data 322 of the wireless link 130 to provide a continuity-of-function for vehicle applications. The transition may be based upon when a wireless-link trigger condition of the wireless link 130 may become degraded, has an a priori no-service condition, and/or an excessive wireless-link service cost condition, as is discussed in detail with reference to FIGS. 1 through 4.

Figure 4:
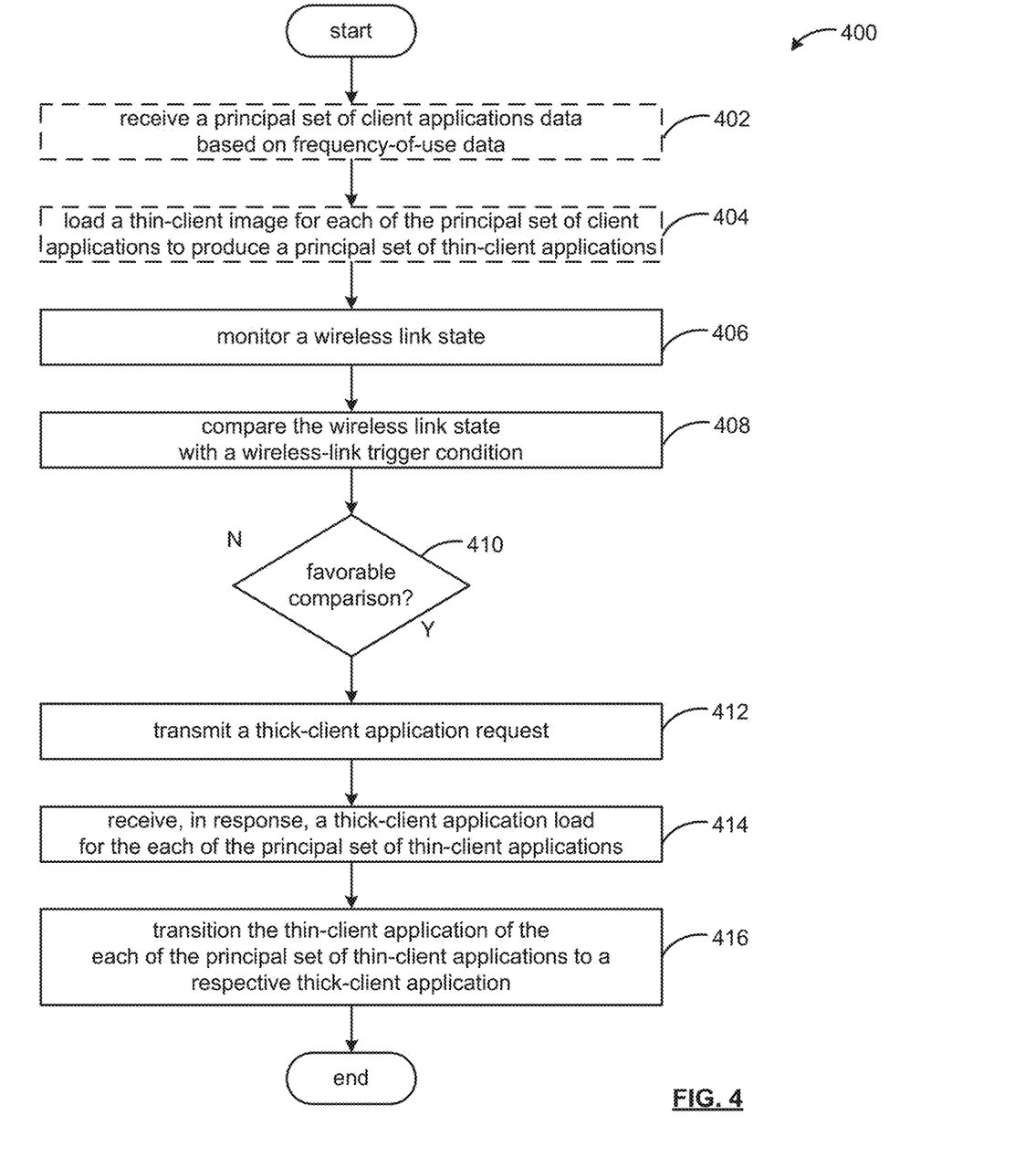
FIG. 4 is an example process for providing a continuity-of-function for vehicle client applications based upon a wireless-link trigger condition.

FIG. 4 is an example process 400 for providing continuity-of-function for vehicle client applications based upon a wireless-link trigger condition. As shown, operations 402 and 404 are illustrated in phantom lines regarding the client applications that may be installed with the vehicle on a frequency-of-use basis. That is, for applications that are seldom used, or not at all, then such applications do not need to reside with electric vehicle to free-up additional memory (static and/or dynamic) memory resources of the vehicle, and associated power allocation. The frequency-of-use may be based on the historic use and/or access by a passenger and/or operator, such as media controls, volume controls, power train modes (such as a sport driving mode, a ultra-conservative driving mode, etc.), and the like.

In operation 402, a principal set of client applications data is received based on frequency-of-use data. In operation 404, a thin-client image for each of the principal set of client applications may be loaded to produce a principal set of thin-client applications for execution by a passenger and/or operator of the electric vehicle.

For a client/server architecture, an initial assessment may be whether the client or the server handles the bulk of the workload, and in this regard, the assignment of processing and power resources as well. A client in this respect may relate to an application that is executable by the local vehicle control unit (such as a HVAC control unit, a navigation control unit, a voice control unit, etc.), and relies on a server to perform as few or as many operations relating to the application.

For a thin client architecture, a terminal or Java-based client may be executable via a control unit (through a user interface command) and based a thin hardware platform. In this respect, a lower power requirement may be had for the implementation of a thin hardware platform, while extensive processing requirements may be transferred to a server architecture via a wireless communication of the vehicle. The advantages of a thin-client application may be limited, however, by the stability of wireless communications with the vehicle, or by the affordability of the wireless communication.

In operation 406, a wireless link state may be monitored, and at operation 408, compared with a wireless-link trigger condition. The comparison with a wireless-link trigger condition operates to determine instances in which an electric vehicle 100 (FIG. 1) may enter a wireless-link trigger condition in which a location or upcoming location proffers a wireless communication link that may be and/or become non-existent, limited, or expensive to use.

For example, the wireless-link trigger condition may be an a priori no-service condition. In this respect, such as with respect to cellular provider coverage, geographic areas may not be serviced by a wireless service provider and/or obstructed by tunnels, buildings, etc. Such areas may generally be discoverable by coverage maps and identified wireless dead zones. A location of the vehicle 100 may be determined in real-time or near real-time to determine the a priori boundary beyond which the wireless link 130 may be at an a priori no-service condition.

As another example, the wireless-link trigger condition may be that the wireless link suffers a wireless-link signal degradation condition. In this respect, the wireless link 130 may exist, but at a less-than-optimal strength (such as low signal-to-noise ratio), at an excessive collision or high error rate that may require multiple retransmission of data to/from A server (such as a high bit-error rate), that the wireless link 130 may revert to a lower data rate (such as from an LTE data rate to a 3G data rate), etc. Also, in some instances as well, the wireless signal may transition to a lower upload/download data rate, such as from an LTE-based signal to a slower 3G-based signal. Though the wireless communication may still be present, the effectiveness for providing real-time and/or near real-time data processing may be curtailed by lower data rates.

As yet another example, the wireless-link trigger condition may be an excessive wireless-link service cost condition. For example, while data rates fees may be considered tolerable or reasonable in one service area, on traveling with the vehicle to another service area (such as another carrier), the data rate fees for comparable data rates may be excessive, may incur roaming charges, and also may cause the beacon function of the wireless link to excessively burden a state-of-charge for the power source of an electric vehicle.

When at operation 410 the wireless link state compares favorably with the wireless-link trigger condition, at operation 412 a thick-client application request may be transmitted to move processing from a remote server source to the local source at the vehicle platform level. In response to the thick-client application request, a thick-client application load for the each of the principal set of thin-client applications, and the thin-client application of the each of the principal set of thin-client applications are transitioned to a respective thick-client application, which may then take possession of processing the applications for continuity-of-feature capability at the vehicle level.

Various embodiments are shown in FIGS. 1-4, but the embodiments are not limited to the illustrated structure or application. As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:
monitoring a wireless link state for an electric-powered vehicle;
comparing the wireless link state with a wireless-link trigger condition;
when the wireless link state compares favorably with the wireless-link trigger condition:
transmitting, via a wireless link, a thick-client application request based on the wireless-link trigger condition;
receiving, in response, a thick-client application load; and
transitioning a thin-client application to a thick-client application.

2. The method of claim 1, further comprising:
disabling the wireless link of the electric-powered vehicle.

3. The method of claim 2, further comprising:
while the wireless link state compares favorably with the wireless-link trigger condition, maintaining the disabling of the wireless link of the electric-powered vehicle.

4. The method of claim 1, wherein the wireless-link trigger condition includes a wireless-link signal degradation condition.

5. The method of claim 1, wherein the wireless-link trigger condition includes an a priori no-service condition.

6. The method of claim 1, wherein the wireless-link trigger condition includes excessive wireless-link service cost condition.

7. The method of claim 2, wherein the disabling the wireless link of the electric-powered vehicle further comprises:
sending a user confirmation request; and
receiving in response a user acknowledgment.

8. A method for managing a client application load of an electric vehicle, the method comprising:
receiving a principal set of client applications data based on frequency-of-use data;
loading a thin-client image for each of the principal set of client applications to produce a principal set of thin-client applications;
monitoring a wireless link state;
comparing the wireless link state with a wireless-link trigger condition;
when the wireless link state compares favorably with the wireless-link trigger condition:
transmitting a thick-client application request;
receiving, in response, a thick-client application load for the each of the principal set of thin-client applications; and
transitioning the thin-client application of the each of the principal set of thin-client applications to a respective thick-client application.

9. The method of claim 8, further comprising:
disabling the wireless link of the electric-powered vehicle.

10. The method of claim 9, further comprising:
while the wireless link state compares favorably with the wireless-link trigger condition, maintaining the disabling of the wireless link of the electric-powered vehicle.

11. The method of claim 8, wherein the wireless-link trigger condition includes a wireless-link signal degradation condition.

12. The method of claim 8, wherein the wireless-link trigger condition includes an a priori no-service condition.

13. The method of claim 8, wherein the wireless-link trigger condition includes excessive wireless-link service cost condition.

14. The method of claim 9, wherein the disabling the wireless link of the electric-powered vehicle further comprises:
sending a user confirmation request; and
receiving in response a user confirmation.

15. A client application load management unit for an electric vehicle comprising:
a communication interface to service communication with a vehicle network and an external network;
a processor communicably coupled to the communication interface; and
memory communicably coupled to the processor and storing:
an electric-vehicle client application load module including instructions that, when executed by the processor, cause the processor to:
produce frequency-of-use data;
receive, in response to the frequency-of-use data, principal set of client applications data that functions to identify the principal set of thin-client applications for an electric vehicle; and
load a thin-client image for each of a principal set of thin-client applications; and
a wireless link module including instructions that, when executed by the processor, cause the processor to:
monitor a wireless link state for an electric-powered vehicle;
compare the wireless link state with a wireless-link trigger condition;
when the wireless link state compares favorably with the wireless-link trigger condition:
transmit, via a wireless link, a thick-client application request;
receive, in response, a thick-client application image for the each of the principal set of client applications; and
transition the thin-client application of the each of the principal set of thin-client applications to produce a respective thick-client application.

16. The client application load management unit of claim 15, further comprising:
disabling the wireless link of the electric-powered vehicle.

17. The client application load management unit of claim 16, further comprising:
while the wireless link state compares favorably with the wireless-link trigger condition, maintaining the disabling of the wireless link of the electric-powered vehicle.

18. The client application load management unit of claim 15, wherein the wireless-link trigger condition includes a wireless-link signal degradation condition.

19. The client application load management unit of claim 15, wherein the wireless-link trigger condition includes an a priori no-service condition.

20. The client application load management unit of claim 15, wherein the wireless-link trigger condition includes excessive wireless-link service cost condition.

* * * * *